(12) United States Patent
Skoog et al.

(10) Patent No.: US 8,861,346 B2
(45) Date of Patent: Oct. 14, 2014

(54) VIDEO PACKET MULTIPLEXER WITH INTELLIGENT PACKET DISCARD

(75) Inventors: Frederick Skoog, Colleyville, TX (US); John Blanton, Dallas, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 439 days.

(21) Appl. No.: 13/112,753

(22) Filed: May 20, 2011

(65) Prior Publication Data

US 2011/0222400 A1      Sep. 15, 2011

Related U.S. Application Data

(63) Continuation of application No. 11/337,403, filed on Jan. 23, 2006, now abandoned.

(51) Int. Cl.
*H04L 7/00* (2006.01)
*H04L 12/801* (2013.01)
*H04L 12/841* (2013.01)
*H04L 12/823* (2013.01)
*H04L 12/853* (2013.01)

(52) U.S. Cl.
CPC ............... *H04L 47/10* (2013.01); *H04L 47/11* (2013.01); *H04L 47/286* (2013.01); *H04L 47/283* (2013.01); *H04L 47/32* (2013.01); *H04L 47/12* (2013.01); *H04L 47/19* (2013.01); *H04L 47/2416* (2013.01)
USPC ............................ 370/230; 370/252; 370/394

(58) Field of Classification Search
CPC .. H04L 12/14; H04L 12/1414; H04L 12/1496
USPC .................................. 370/230, 235, 498, 537
See application file for complete search history.

(56) References Cited

U.S. PATENT DOCUMENTS

| | | | |
|---|---|---|---|
| 5,444,706 A | 8/1995 | Osaki | |
| 6,031,940 A * | 2/2000 | Chui et al. | 382/240 |
| 6,751,194 B1 * | 6/2004 | Ueno | 370/235 |
| 6,967,924 B1 * | 11/2005 | Aimoto | 370/235 |
| 6,990,071 B2 | 1/2006 | Adam et al. | |
| 7,499,402 B2 | 3/2009 | Keating et al. | |
| 2002/0110134 A1 | 8/2002 | Gracon et al. | |
| 2007/0156916 A1 * | 7/2007 | Schiefer | 709/232 |

* cited by examiner

*Primary Examiner* — Donald Mills
*Assistant Examiner* — Henry Baron
(74) *Attorney, Agent, or Firm* — RGIP LLC

(57) ABSTRACT

A IP video delivery system (10) includes a multiplexer (30) for transmitting multiple data streams of packets over link (31) to a site having one or more receivers (22). During times of congestion, the multiplexer will discard packets from its internal queues. Packets are intelligently chosen to minimize the effects on the output from the receivers (22) by taking into account timing information related to the packets and priority.

20 Claims, 8 Drawing Sheets

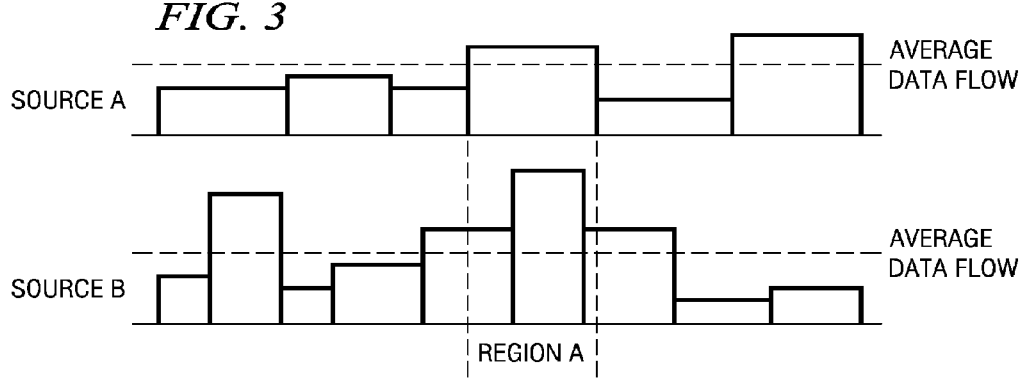
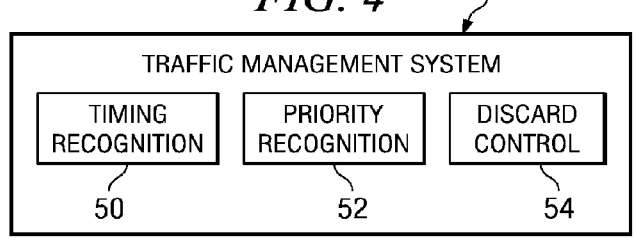
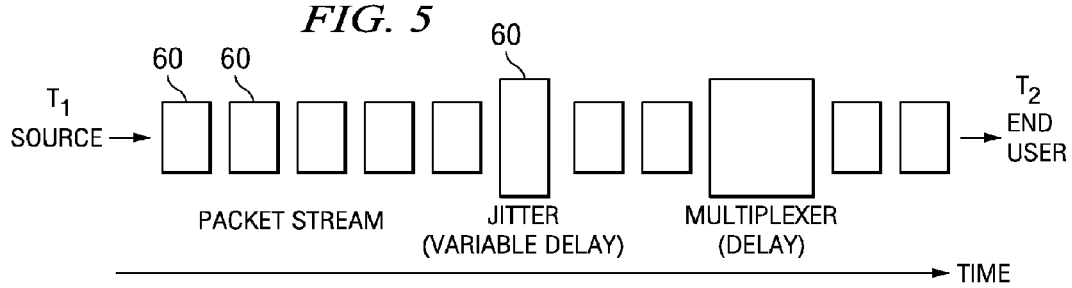

US 8,861,346 B2

VIDEO PACKET MULTIPLEXER WITH INTELLIGENT PACKET DISCARD

CROSS-REFERENCES

This application is a continuation application of U.S. application Ser. No. 11/337,403, filed Jan. 23, 2006, entitled "VIDEO PACKET MULTIPLEXER WITH INTELLIGENT PACKET DISCARD".

STATEMENT OF FEDERALLY SPONSORED RESEARCH OR DEVELOPMENT

The U.S. Government has a paid-up license in this invention and the right in limited circumstances to require the patent owner to license others on reasonable terms as provided for by the terms of Award No. 70NANB3H3053 awarded by National Institute of Standards and Technology.

BACKGROUND OF THE INVENTION

1. Technical Field

This invention relates in general to network communications and, more particularly, to a method and apparatus for discarding packets.

2. Description of the Related Art

In a digital information delivery network, between a source device and a destination device, packets of data may be lost for a variety of reasons. Some packets are randomly lost due to uncontrollable errors—for example, errors caused by noise on a transmission line, synchronization-issues, etc.—Some packets are lost due to congestion, i.e., it is not possible for a network element to transmit all received packets in a timely manner. Current discard mechanisms for IP QoS (quality of service) algorithms implement random selection schemes to determine which packets to discard without regard to the relative effect on the eventual output.

For some data transfer protocols, missing packets cause the destination device to request a retransmission of the missing information. This is not very feasible, however, in a network that has multicasting of real-time streams such as audio or video. Normally, there will not be enough time available for requesting and receiving the retransmitted packets, unless buffers at the destination device are very large.

When an expected packet in a packet stream is not received at the destination device, the destination device waits for a certain amount of time before declaring a packet as lost. Once a packet is declared as lost, some decoders may request retransmission, other decoders may correct the problem to the extent possible by error concealment techniques. Error concealment techniques will in most cases result in degradation of output quality and are incapable of correcting some errors; further, the degree of the output error will be different depending upon the type of data in the lost packet, some of which will be more difficult to conceal than others. Thus, if packets must be discarded, some types of packets will be better candidates for discarding than others.

Accordingly, there is a need for a method and apparatus for identifying and discarding packets to minimize output errors.

BRIEF SUMMARY OF THE INVENTION

In the present invention, a multiplexer for broadband subscriber access comprises a memory queue for storing packets of video information and traffic management circuitry for selectively discarding one or more packets from the memory queue responsive to a detection of congestion in the memory queue based on parameters associated with existing packets currently in the queue.

The present invention provides significant advantages over the prior art. By selectively discarding packets from the queue, the degradation of the resulting video during times of congestion is greatly improved.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3 illustrates how congestion can occur at the multiplexer because of aggregated data rates can exceed expected average aggregated data rates;

FIG. 4 illustrates a block diagram of a traffic management system of the multiplexer of FIG. 3;

FIG. 5 illustrates timing considerations in the transmission of a packet between a source and its destination;

DETAILED DESCRIPTION OF THE INVENTION

The present invention is best understood in relation to FIGS. 1-19 of the drawings, like numerals being used for like elements of the various drawings.

Figure 1:
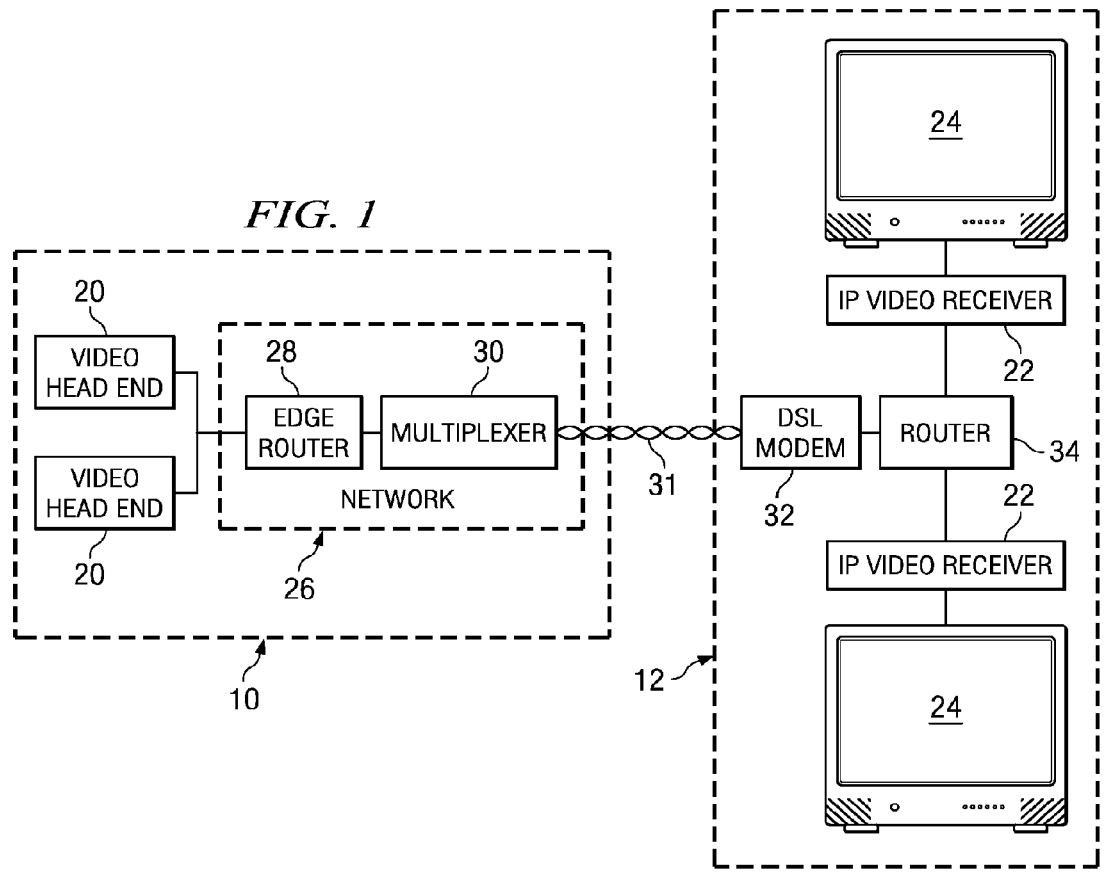
FIG. 1 illustrates a block diagram of a IP video delivery system.

FIG. 1 shows a block diagram of an IP video network 10 for sending video programming to a site 12. Sources (such as video head ends, or VHEs) 20 provide the programming by streaming video information in packets. The packets are ultimately received by one or more IP video receivers 22 at the site 12. The IP video receivers 22 translate the video packets to video for video monitors 24. To get to the IP video receivers 22, the data must pass through a public/private network 26 which may include a plurality of routers, including edge router 28. The output of edge router 28 is received by multiplexer 30 (which could be, for example, a DSLAM access element), where the data for multiple video channels is placed on twisted pair lines 31. A modem 32 (such as a DSL modem)

on the user site communicates between the multiplexer 30 and the IP video receivers 22 through on-site router 34.

In operation, the VHE sources 20 stream video information to the IP video receivers 22. For live video broadcasts, such as a live television signal, the video data is typically sent as a multicast transmission. For on-demand video, unicast transmission may be used. At the receiver side, on-demand video generally has a longer buffer, since the delay from source 20 to viewing is not important as broadcast video servers and, thus, on-demand video has a lower priority than live broadcast video services. The site 12 may have several IP video receivers 22 each receiving multiple streams of programming. For example, each IP video receiver 22 could receive two video data streams. If there were three IP video receivers 22 in the site 12, and each receiver 22 was receiving two video streams, then the link 31 between the multiplexer 30 and the modem 32 would be carrying video packets for six different data streams.

Modern day video protocols compress the video stream by periodically sending a full frame (compressed) of video data, followed by differential frames which indicate the changes between frames, rather than the frame itself. Accordingly, a scene which has a rapidly changing image will require a higher bandwidth than a frame that is relatively still. The total available bandwidth between the video heads 20 and the IP receivers 22 for a site 12 is generally fixed by the bandwidth of link 31, in view of the technology used by the multiplexer 30 and modem 32.

With a fixed bandwidth in which to transfer all packets for all data streams for a site 12, the number of data streams supported by the link 31 is determined by an average bandwidth for each received channel (link 31 can be carrying other data traffic such as Internet traffic, which has a lower priority than the live video data streams (lowest priority) and voice (VOIP—voice over Internet protocol, which generally has the highest priority). However, the data rates for the separate N data flows are not constant. At times, multiple channels may be simultaneously using more than their average bandwidth, resulting in congestion on link 31.

Figure 2:
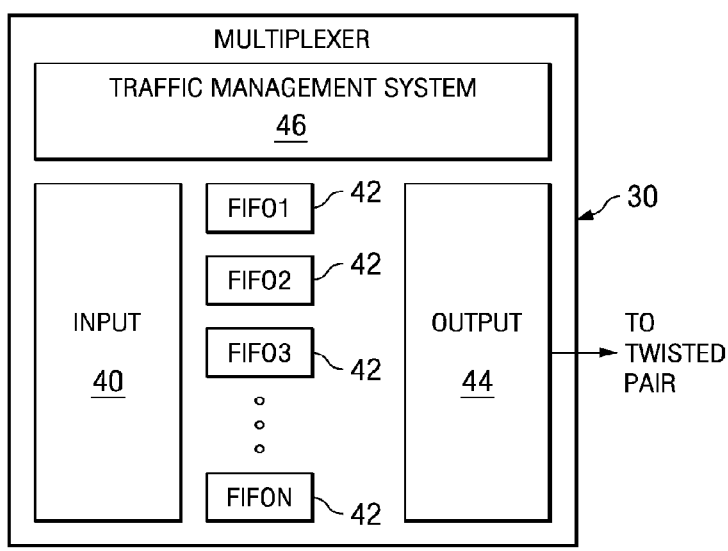
FIG. 2 illustrates a block diagram of a multiplexer of FIG. 1.

FIG. 2 illustrates a block diagram of the multiplexer 30 supporting N different data streams. For a system designed to provide viewing up to two data streams over three receivers 22, N would equal six. An input stage 40 receives various video streams and sorts packets for different data streams into respective FIFO (first in, first out) memories 42. An output stage 44 multiplexes packets from the FIFO memories 42 onto the link 31. At the site 12, router 34 directs packets to the proper receiver 22. Traffic Management System 46 controls the multiplexing of the packets from memories 42 onto the link 31, as described in greater detail below.

The congestion problem is illustrated in FIG. 3. When the combined data rates from the N sources exceed the capacity of the link 31 and the capacity of the multiplexer 30 to buffer the overage in its FIFO memories 42, the traffic management system 46 must make intelligent decisions about which packets to discard to minimize any adverse effects on data service to the end user. The situation is illustrated in FIG. 3, which employs only two data sources (N=2). In FIG. 3, data packets come from Source A and Source B. Each source implements a policy to provide data at a known average rate. The data from the two sources must be merged onto link 31, which has a capacity to accommodate the combined average data rates. Limited buffering is available from the FIFO memories 42; however, it is desirable to keep the FIFO memories as small as possible; otherwise a noticeable delay will occur when live video channels are switched. When the combined data rates from the sources exceeds the average for too long, the capacity to buffer the excess data is exceeded, and some packets must be dropped. Even if the multiplexer 30 has the memory capacity to buffer additional packets, it may need to drop packets because of timing considerations associated with its FIFO 42. For example, a multiplexer 30 may have a requirement that all packets will be sent within 200 ms of receiving that packet. If the condition cannot be met for an incoming packet, the multiplexer will either need to not place the incoming packet in the FIFO 42 or drop packets already in the FIFO 42.

In operation, the multiplexer 30 is designed to minimize the effect of dropping packets. A critical aspect of the problem is that all packets are time-critical. For each data stream all packets are generated on a single server (VHE 20). Once generated, each packet has a strict "use by" time. A packet that becomes stale in transit to the end user becomes unusable. To conserve shared link bandwidth, stale packets must be discarded without being transmitted over the link 31.

In operation, multiplexer 30 conforms to a policy that requires the minimum degradation of service to the end user when packets are discarded. This goal is accomplished in two basic ways: (1) the multiplexer 30 discards the minimum amount of data necessary to avoid congestion and (2) the multiplexer 30 makes use of a priority scheme to ensure the least useful packets are preferentially discarded.

To accomplish these goals, four mechanisms may be used. First, in the absence of explicit time schedule information associated with the packets, the multiplexer 30 can use a self-clocking mechanism that uses packet arrival times to determine packet use-by times. The multiplexer 30 can use priority codes associated with each packet to determine which packets to drop first. The priority scheme can also identify packet interdependencies, so that when a superior packet is dropped, packets that depend on that packet can be identified and also be dropped.

A look-ahead feature can identify the nature of future traffic and allow the multiplexer 30 to make better decisions about which packets to drop. For example, when knowledge of future traffic indicates that a high priority packet will arrive, the multiplexer 30 can drop packets currently in its queues to eliminate congestion in advance. Further, a traffic analysis function 30 can examine all queued traffic plus all known future traffic and determine the optimum set of packets to drop.

FIG. 4 illustrates a block diagram of the traffic management system 46. Traffic management system 46 includes a timing recognition function 50, a priority recognition function 52 and a discard control function 54. The timing recognition function 50 derives information which can be used to determine the time at which a particular packet will become stale. The priority recognition function determines a priority for a particular packet, either explicitly or implicitly. The discard control function 54 determines which packets should be discarded. These functions are described in greater detail below. These functions could be implemented on a general purpose processor, DSP (digital signal processor) or other processing device.

FIGS. 5-12 illustrate the timing recognition function 50. FIG. 5 illustrates a video packet source that generates packets 60 and an end user that consumes the packets 60. If a packet is generated at time $T_1$ it must be available to the end user at time $T_2$. If the user receives the packet after $T_2$ the packet cannot be used. The packet stream passes through the multiplexer 30 (any other packet streams are not shown in the diagram). In order to accomplish its task of merging multiple packet streams the multiplexer 30 will need to delay some of the packets 60. The end-to-end time budget for the packets includes some delay by the multiplexer 30. One of the considerations for the multiplexer design is that packets must not be delayed so much that the end-to-end schedule is compromised. Complicating the situation is jitter 61 in the packet delay timing. Jitter is represented in the diagram as a variable delay function in the packet transport.

To enable the multiplexer 30 to discern the end-to-end schedule, the source 20 cooperates by generating (and transmitting) packets 60 according to a predictable schedule. The simplest such schedule involves transmitting packets at equal time intervals, which may be agreeable with a video service that sends one packet for each video frame. However, other transmission timing schemes will work as well. What is necessary is that the multiplexer 30 can detect the timing pattern and "lock onto" it. In this way, the packets are "self clocking." They provide the timing signal the multiplexer 30 uses to determine the appropriate time schedule for each packet.

Figure 6:
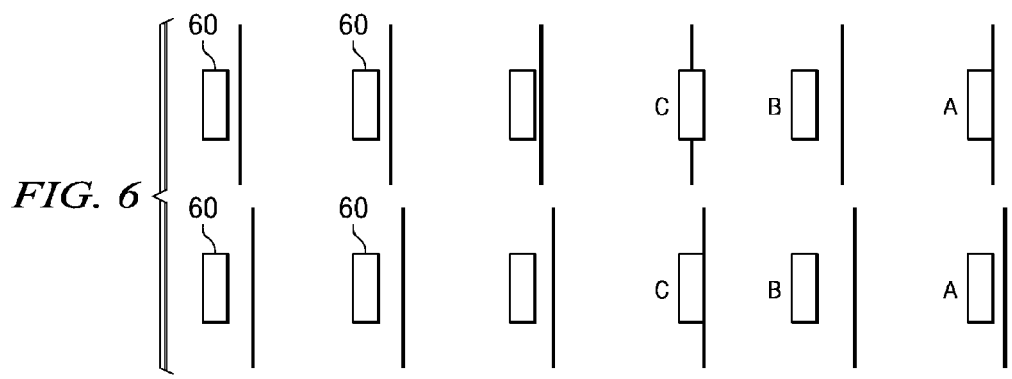
FIG. 6 illustrates operation of the timing recognition function of the traffic management system of FIG. 4.
Figure 7:
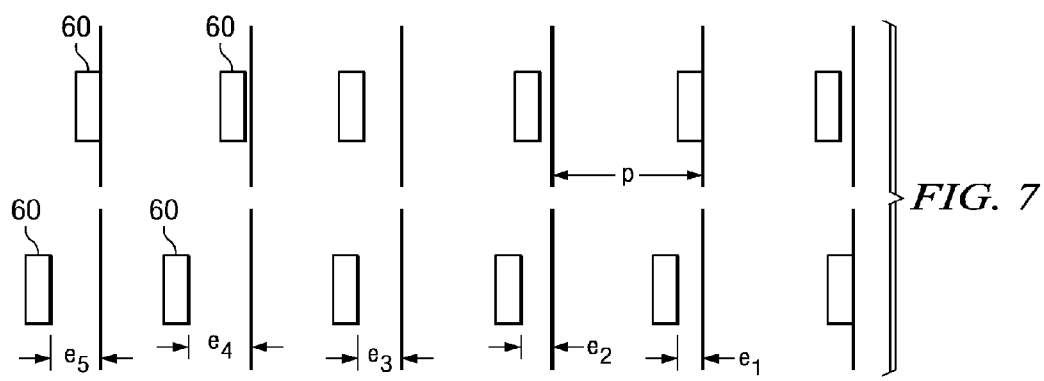
FIG. 7 illustrates operation of the timing recognition with respect to varying time periods.

The operation of the timing recognition function 50 is illustrated in FIG. 6. This diagram illustrates the case of packets equally spaced in time. Packets from the source 20 arrive at the multiplexer 30 after a variable delay due to the jitter function. The timing recognition function 50 implements a synchronizer function based on the assumption packets never arrive early. When a packet 60 arrives the synchronizer starts a timer. When a subsequent packet arrives the time between packets is noted. In the upper part of the diagram the timing schedule is assumed from packet A. Packet B arrives behind schedule and is assumed to be delayed. The schedule is not changed. Packet C arrives ahead of schedule, and the schedule is shifted backwards, as shown in the lower part of the diagram. Once the schedule has been synchronized with the packet stream the multiplexer 30 adds its time budget to the arrival schedule to compute the stale time for the packets.

A refinement to the time synchronizer function allows it to accommodate a varying time period. A varying time period would be symptomatic of clock drift between the multiplexer 30 and the packet source 20. In the top part of FIG. 7 the packet delay is bounded and maintains an average value. In the bottom part of the diagram the packet delay (e1, e2 . . . ) average increases with time. The synchronizer function detects the increasing delay and accommodates it by increasing the time period p of the expected packets.

To accommodate a varying packet rate, the synchronizing function computes a running average of the packet delay over a fixed number of the most recent delay times. The packet schedule will be adjusted using the following formula: $p_{i+1} = (1-\alpha)p_i + \alpha \cdot \Delta$.

In this formula $p_i$ is the projected period for computing the schedule for the next packet. $\Delta$ is the measured time between the two most recent packets, and $0 < \alpha < 1$. When $\alpha$ is small (close to zero) the period will be adjusted to accommodate a slowly varying packet rate.

Figure 8:
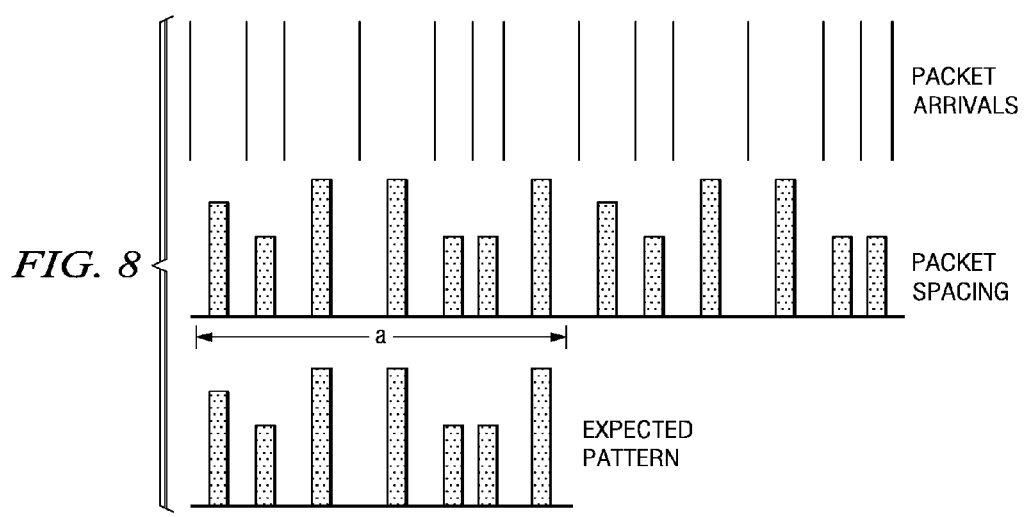
FIG. 8 through 10 illustrate operation of the timing recognition with respect to cyclic packet spacings.

Even when the packet spacing is not uniform, the multiplexer 30 will synchronize with the packet stream, provided the packet spacing is cyclic or otherwise predictable. When the packet spacing is cyclic and known in advance, synchronization can be accomplished by pattern matching, as shown in FIG. 8. Bars in the top row represent the arrival of packets at the multiplexer, and the spacing between packets is represented by the height of the vertical bars in the second row. The bottom row represents the expected pattern of packet spacings. Spacings between packets are recorded and matched against the expected pattern.

Figure 9:
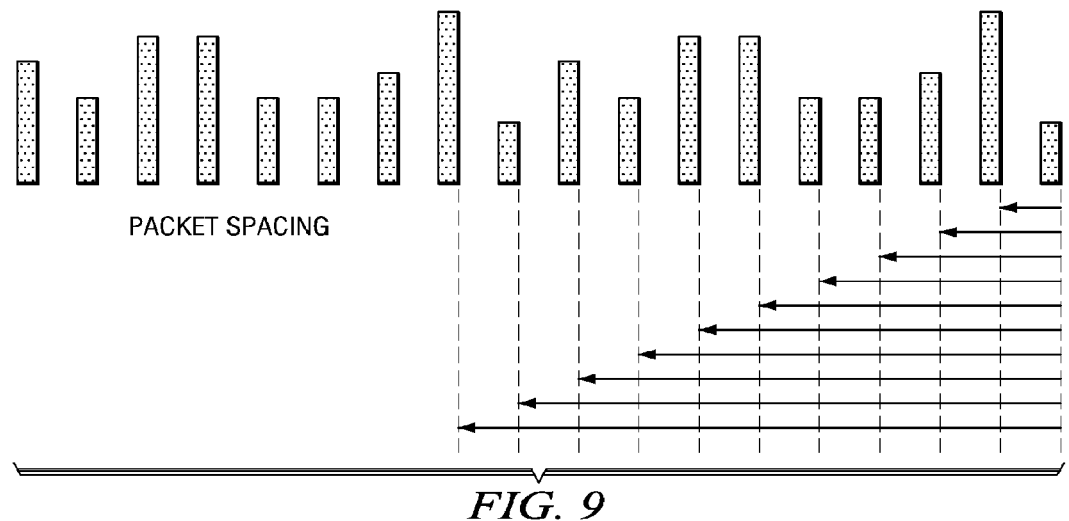
Figure 10:
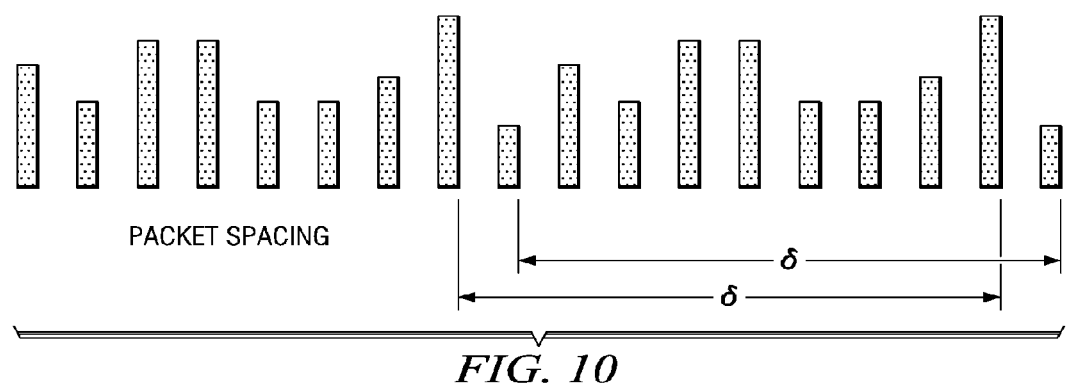

Since the incoming packets are subject to delay jitter, there will not be a perfect match between the expected pattern and the actual pattern. The multiplexer will need to assess the match (correlation) between the expected pattern and the actual pattern and determine the point of best correlation. The correlation between the expected pattern and the actual pattern is computed by the following formula: $c = \alpha \times |A_i - E_i|$ This is the sum of the absolute values of the differences between the actual (A) and expected (E) values over the region $\alpha$. The region for which the sum is minimum is the best match. When the spacing pattern is not known in advance, the multiplexer 30 will detect it. The method for detecting the traffic pattern involves comparing inter-packet spacings. In the simplest method, the current inter-packet spacing is recorded and compared with subsequent inter-packet spacings. This operation is performed with differing offsets between the spacings used in the comparison and is illustrated in FIGS. 9 and 10. FIG. 9 illustrates various timing offsets from a given packet. FIG. 10 illustrates finding an offset that correlates to the most likely period of a pattern of spacings. The offset that produces the best correlation in terms of absolute differences ($\delta$ in FIG. 10) is the period of the pattern. By recording the pattern and using it to match with future traffic, the multiplexer can synchronize with the packet arrival times.

Figure 11:
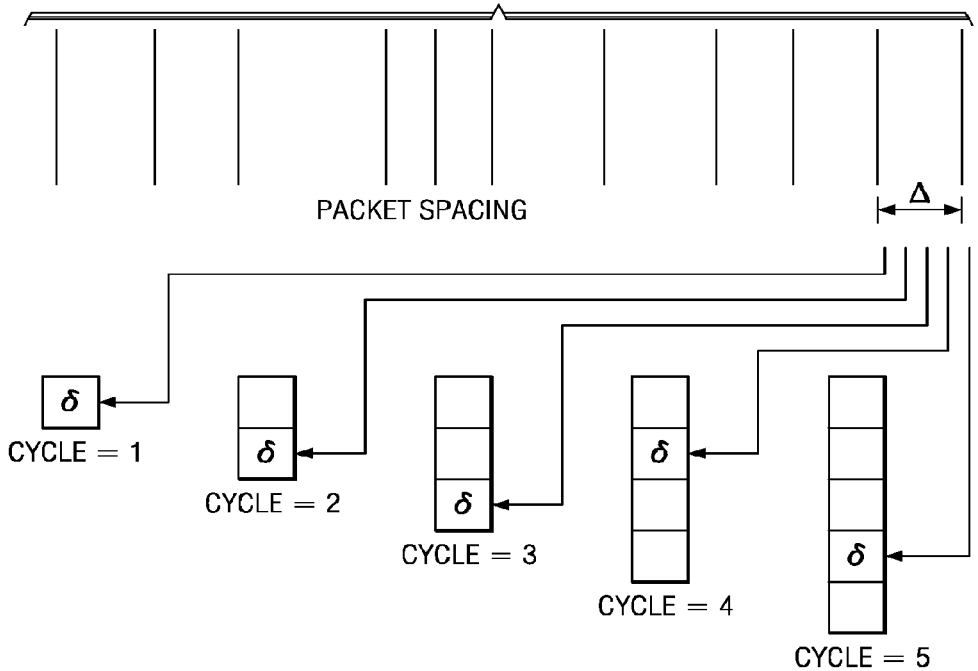
FIG. 11 illustrates a implementation for determining a best correlation of cyclic spacings.

A possible implementation scheme for determining $\delta$ is shown in FIG. 11. As packets arrive the packet spacing is measured, and the values are entered into multiple circular buffers. There is one buffer for each possible sequence length and each buffer has its own pointer, which is advanced after each packet. Packet spacing values are added to the buffers using the following formula: $\delta_{i+1} = (1-\alpha) \delta_i + \alpha \cdot \Delta$.

In the formula $0 < \alpha < 1$. This causes each $\delta$ to converge to the average of the most recent values of $\Delta$. When the length of a circular buffer equals the length of the cyclic packet sequence, the values of the $\delta$s will converge to the $\Delta$s in the packet spacing sequence. If the jitter function is well-behaved, the averages of the $\Delta$s will be the specified packet spacing values, and the $\delta$s will be an accurate representation of the spacing pattern. When the length of a buffer does not match the length of the packet sequence, the value of the $\delta$s will tend to converge to the average packet spacing over the whole sequence.

Figure 12:
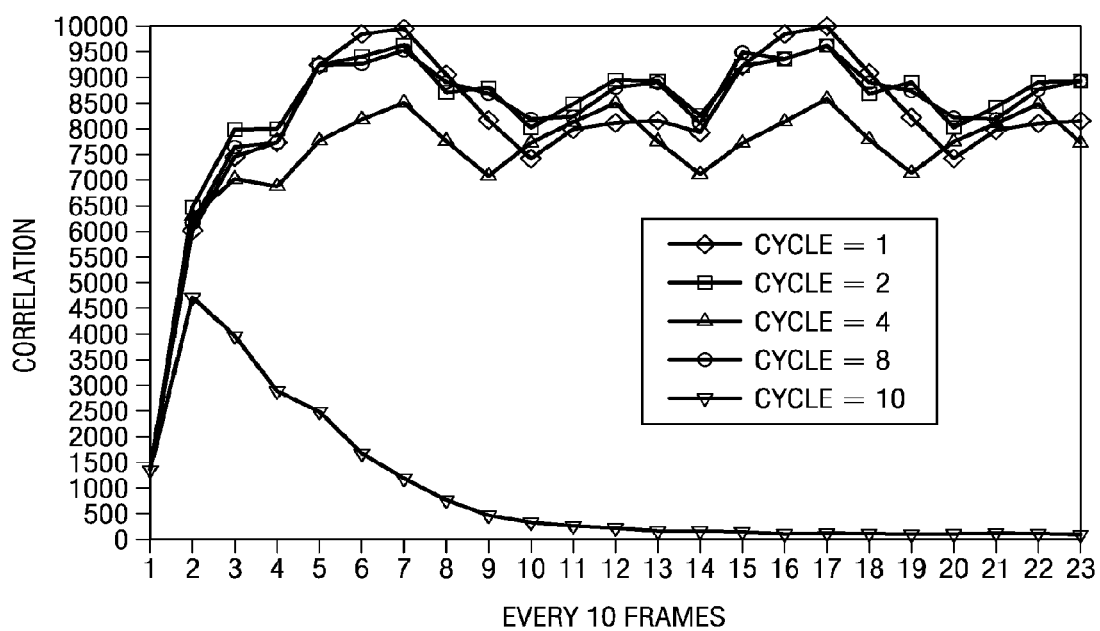
FIG. 12 is a graph showing simulations of predicted values of packet spacings with actual values.

This scheme has been tested by simulation. The simulation compared predicted values of the packet spacing with actual values and plotted the correlation (absolute value of the difference). The plots in FIG. 12 are from a simulation that used 20 circular buffers. Plots for the correlation function for lengths of 1, 2, 4, 8, and 10 are included. The actual packet sequence length was 10, and the plot shows the correlation function for that length converged, while the correlation for the other lengths did not. The convergence of the correlation function involved a low band pass filter ($\alpha = 0.1$), which resulted in a slow convergence. The plots represent every 10 packets, so it is apparent the 10-length pattern became discernible from the other patterns after about 30 packets.

To compensate for clock drift with cyclic traffic patterns, the previous formula for adjusting the expected spacing is modified. Instead of a single spacing p the formula now uses a set of spacings $p_j$, where $2 \leq j \leq P$, and P is the period of the cycle. The formula becomes the following: $(p_j)_{i+1} = (1-\alpha) \times (p_j)_i + \alpha \cdot \Delta$.

The discard control function 54 of the traffic management system 46 of multiplexer 30 uses priority information associated with the packets to assist in determining which packets to drop. This information is obtained from the priority detection function 52. In a first embodiment of the priority detection function, the packet source provides a priority indicator to communicate dropping preferences to the multiplexer.

Making use of several priority levels, the dropping priorities could be coded according to the following scheme:

1. Priority 0 is the highest priority. No priority 0 packet will be dropped unless there are no other packets to drop.

2. If the multiplexer encounters a sequence of packet priorities of the form a a . . . a, if one of the packets is dropped, all such packets in the sequence must be dropped.

3. A sequence of the form a a . . . b . . . a a, where a=b+1 (i.e., a is lower priority than b), indicates the a packets are dependent on the b packet. If the b packet is dropped, then the a packets must be dropped as well.

4. A sequence of the form b c d . . . e, where b<c<d, and e<d indicates that dropping the b packet requires that c, d . . . packets be dropped, but it does not require that the e packet be dropped.

5. Similar rules can be encoded in the packet priority scheme in order to extend the logic to more complex dropping policies.

The discard control function 54 bases its packet dropping decisions on information about packets in its queues 42. It is desired to minimize the number of packets queued at the multiplexer for several reasons:

1. Queuing packets requires memory hardware.
2. Longer queues represent more delay.
3. Longer queues represent more packets that have to be flushed when one packet stream is stopped and replaced by another (as when a different channel is selected by a video customer).

Figure 13A:
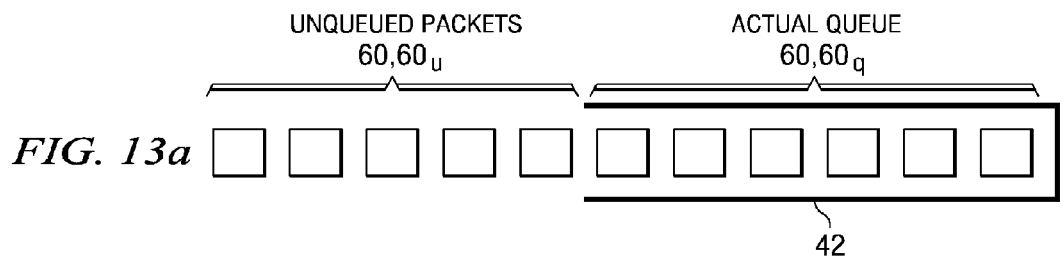
FIG. 13a illustrates an embodiment for receiving information about upcoming packets.

Some of these difficulties can be alleviated by queuing information about packets without actually queuing the packets. FIG. 13a illustrates the concept. The diagram in the top of the figure shows queued packets 60.sub.q actually stored in one of the queues 42 in the multiplexer 30 and unqueued packets 60.sub.u that have not yet arrived. The multiplexer 30 has information about the queued packets 60.sub.q, but without information about the unqueued packets 60.sub.u, it cannot take them into account in determining which packets to drop.

Figure 13B:
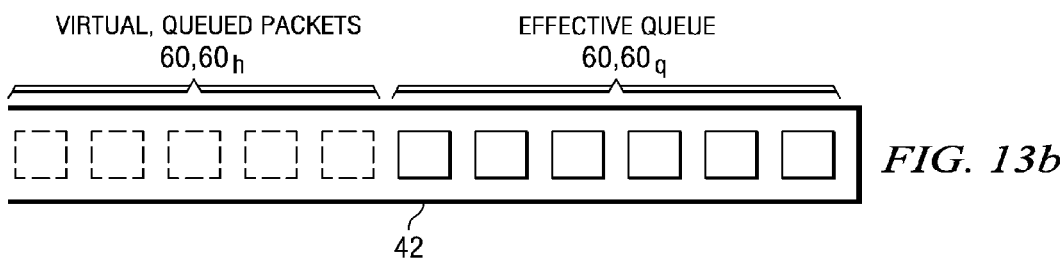
FIG. 13b illustrates storage of virtual and actual packets.

In FIG. 13b, the virtual packets 60h have been stored in a queue 42 in the multiplexer 30. Virtual packets are "header packets" that contain information about the actual packets, but not the payload. A header packet 60.sub.h is sent in advance of each data packet (including payload), and the multiplexer 30 queues the header packets, both header packets 60.sub.q for data packets already at the multiplexer 30 and header packets 60.sub.h for data packets that have not arrived. The discard control function 54 is now able to compute a dropping solution as though all packets, actual and virtual, were queued at the multiplexer. Since the header packets 60h are much smaller than the data packets, more of them can be queued without seriously impacting memory requirements at the multiplexer 30.

The use of header packets 60.sub.h does not alleviate the problem of time delay. Since the header packets 60.sub.h must be sent in advance of the data packets, the data packets are effectively delayed at the source past the time they could have been transmitted.

The packet discard function 54 will minimize data loss by observing priorities related to image dependence and packet age. A primary rule is that shared link bandwidth will not be wasted by transmitting stale data. The secondary rule is that when packets are dropped in accordance with the primary rule, impact on video quality will be minimized.

Figure 14:
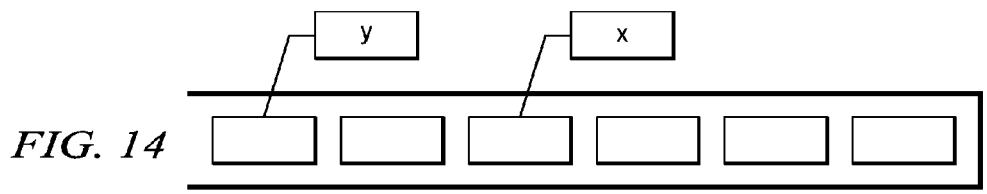
FIG. 14 illustrates the concept of stale packets.

The first rule is enforced by identifying packets with stale data and dropping those packets. In FIG. 14, packets 60 near the head of the queue can be transmitted before their data become stale. However, some of the data in packet a will become stale before it can be transmitted, because packets ahead of it in the queue are large and will take a long time to transmit. If some packets ahead of packet a in the queue are dropped, then packet x can be transmitted before its data become stale. The fact that packet x will become stale (unless other packets are dropped) does not imply packet y will become stale. This is because the schedule of packet y may allow it to be delivered much later.

Figure 15:
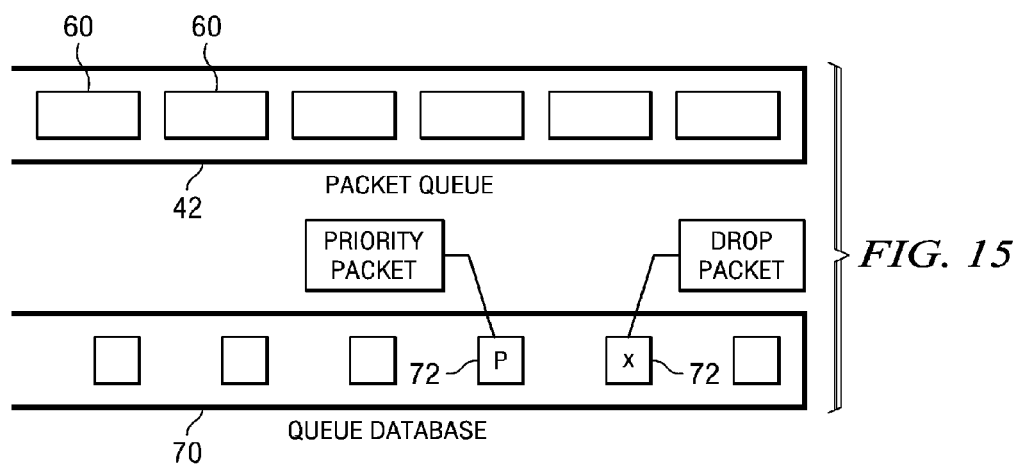
FIG. 15 illustrates a packet discard policy.

The discard control function 54 may implement the packet dropping policy through the use of a packet database 70, as illustrated in FIG. 15. When packets 60 arrive at the multiplexer the database 70 will record corresponding entries 72 of pertinent information required by the traffic management system 46:

1. Size of the packet.
2. Packet priority.
3. Delivery schedule.

Packet priority can be obtained directly from packet header information, or it can be inferred by the size of the packet and/or by the position of the packet in a cyclic traffic pattern. The packet delivery schedule is the time when the last data from the packet must be transmitted through the shared link. The delivery schedule is inferred from the packet arrival time and its position within a cyclic traffic pattern. When the decision is made to drop a packet it is identified in the database.

The discard control function 54 determines whether a packet 60 will become stale by computing the transmission times for the data in the packet 60 and for the data ahead of the packet in its queue 42. To the first approximation the queue time of a packet uses the assumption the queue will be apportioned a certain amount of shared link bandwidth and that the queue will be served on an equitable basis. A preferred embodiment for discarding packets is:

1. Remove packets only from the front of the queues.
2. First remove the front of the queues all packets that are marked for dropping.
3. Examine the remainder of the packets in each queue and determine which packets will become stale by computing their delivery schedule. In computing the expected delivery times, ignore all packets that have been marked
4. For each high priority packet that will become stale, examine lower priority packets in front of it and determine if the high priority packet can be salvaged by dropping the lower priority packet. If this can be accomplished, mark the lower priority packet or packets for dropping. In marking packets for dropping, drop packets closest to the front of the queue first and observe packet dependencies. That is, drop dependent packets as necessary. If a high priority packet cannot be salvaged by dropping lower priority packets, then mark the high priority packet for dropping.
5. Repeat step 4 until there are no more high priority packets that will become stale.
6. From the front of one of the queues, take the packet that has the earliest delivery schedule. In performing this step, observe any established policy for ensuring fair service for the queues. This will allow serving a packet with a slightly later delivery schedule in some cases.

The invention described in connection with FIGS. 1 through 15 provides significant advantages over the prior art in maximizing video quality or other packet services to an end user. First, it identifies potentially stale packets in advance and preserves service quality by discarding low priority packets in order to preserve high priority packets. Second, the invention may compute packet delivery schedules (used to identify stale packets) from packet sequence and packet arrival times without relying on packet internal information. Third, the invention may identify packet sequence patterns and synchronize the packet schedule computations with the arriving packet stream. Fourth, the invention may infer packet priority from packet size or from a packet's position in a sequence without relying on packet internal information. Fifth, the invention may infer packet interdependencies from packet priority sequences and drop additional packets according to their dependencies. Sixth, the invention can use out-of-band header packets or predictions of future packet traffic based on observed traffic patterns to provide advance information about future traffic. Sixth, the invention can use that information in addition to currently queued packets to perform its traffic management computations. This minimizes the number of packets that need to be queued. Seventh, the invention can minimize loss of quality data by making an early identification of potentially stale, high priority packets. It works to preserve high priority packets by dropping lower priority packets. Eighth, the invention performs its task without undue coupling with the packet source. This minimizes the impact of any changes in the design of the packet source.

Figure 16:
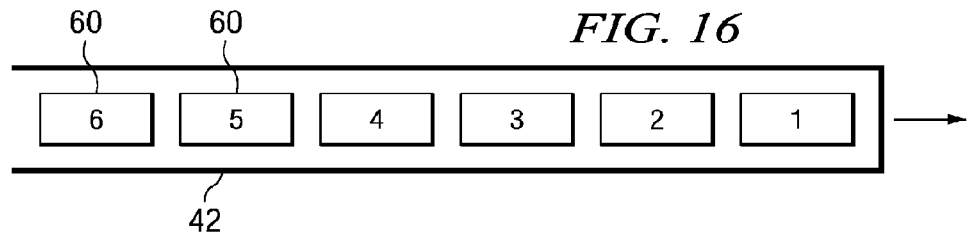
FIG. 16 illustrates an ordered set of packets in a queue for describing an alternative discard method.
Figure 17:
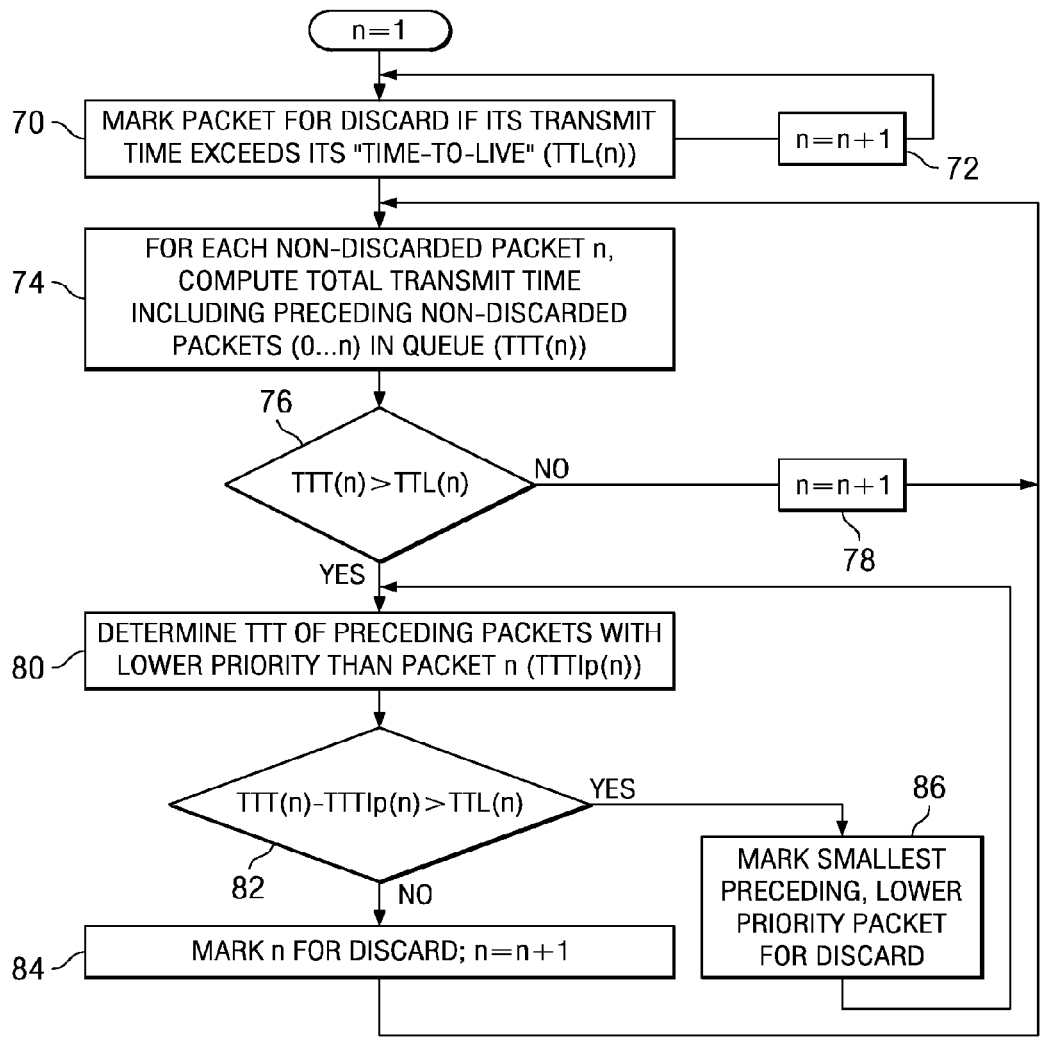
FIG. 17 illustrates a flow chart describing the alternative discard method.

FIGS. 16 and 17 illustrate an alternative method of determining which packets to discard. For reference, FIG. 16 illustrates a sequence of packets 60 in a queue 42. The earliest packet is number "1" and the latest packet is number "6".

FIG. 17 is a flow chart describing operation of a discard process for discarding packets 60 in the queues 42. In step 70, starting with packet "1", a packet n is marked for deletion if it cannot be transmitted over link 31 in a time which is within its "time-to-live" (TTL(n)). Index n is incremented until all such packets are discarded. The purpose of steps 70 and 72 is to remove all packets 60 from the queues 42 if the packet cannot be received at the site 12 in time for use by an IP receiver 22.

In step 74, a total transit time is determined for packet n, taking in consideration the non-discarded packets ahead of packet n (i.e., older packets across all queues 42) is computed; this time is denoted TTT(n). In step 76, if the condition TTT(n)>TTL(n) is not met, i.e., if there will be time to transmit packet n after transmitting all preceding packets, then n is incremented for evaluation of the next packet in step 78. Otherwise, steps are taken to discard lower priority packets ahead of packet n. In step 80, the total transit time of packets which precede packet n but have a lower priority is determined. This value is denoted TTTlp(n). If the condition TTT(n)−TTTlp(n)>TTL(n) is not met in step 82, i.e., if packet n will not be transmitted in time even if all lower priority packets are discarded, then packet n is marked for discard and index n is incremented in step 84.

If the condition TTT(n)−TTTlp(n)>TTL(n) is met in step 82, i.e., packet n can be transmitted in time by discarding one or more of the preceding lower priority packets, then a minimum set of packets is chosen in step 86 by discarding packets in order of increasing size starting at the smallest. This could be done as shown in 17 by discarding the smallest preceding non-discarded packet, and recomputing in step 80, or by determining the minimum time needed for transmitting packet n on time, and summing the transmit times for the preceding packets in order of size, starting at the smallest packet, until the minimum time is reached.

Discarded packets are simply not transmitted by the output stage 44 once they reach the front of the queue 42. For selecting from the various queues 42, the output stage 44 examines each queue 42 in turn in cyclic order using a pointer to determine which queue has the oldest (non-discarded) packet a the head of the queue. If two or more packets have the "oldest" time, then the output stage 44 serves the first queue encountered with the oldest packet. The pointer is advanced one position past the queue served, and the cycle is repeated. The output stage 44, in essence, uses all the FIFOs 42 to create a much larger FIFO.

This embodiment of the invention works to maximize video quality or other packet service to an end user with a number of advantages. First, it ensures that useless packets (packets that cannot be transmitted prior to their "use by" time) are not transmitted through the shared link 31. Second, it minimizes the loss of video quality by preferentially dropping low priority packets and the smallest of the low priority packets. Third, it ensures that a high priority packet is not dropped due to being behind low priority packets in the queue. Fourth, it ensures that the oldest packet in all the queues 42 is preferentially transmitted. Fifth, it ensures all queues 42 are served fairly by providing serving the least recently served queue when all other factors are equal.

Figure 18:
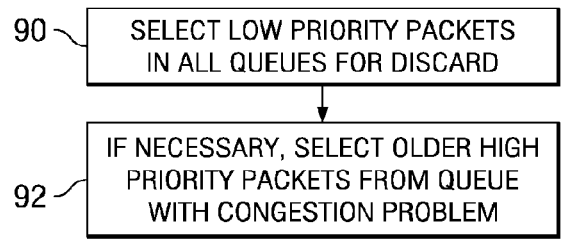
FIG. 18 illustrates another discard method.
Figure 19:
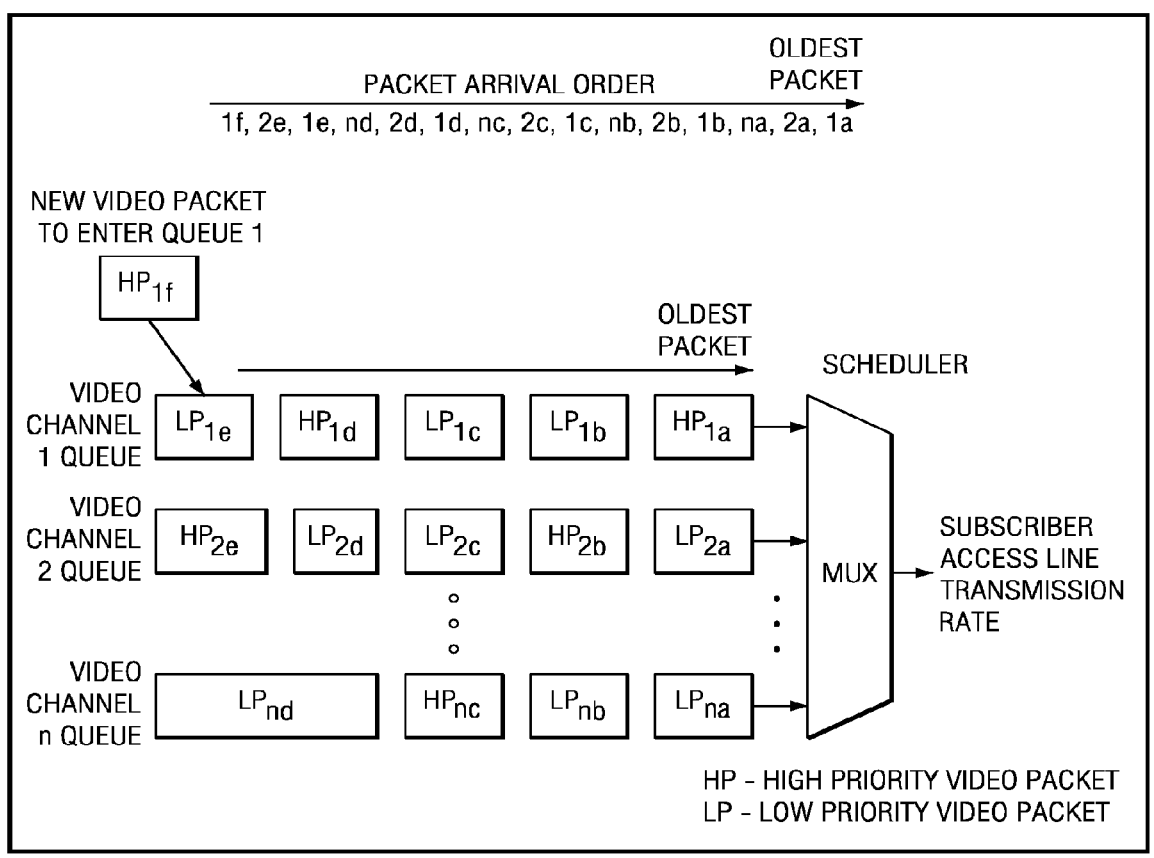
FIG. 19 illustrates an example using the discard method of FIG. 18.

FIGS. 18 and 19 illustrates another embodiment for operation of the discard control function 54. In this embodiment for a multi-queue multiplexer 30, it is assumed that packets are designated in terms of priority, either explicitly by marking at the source 20 or implicitly as described above. Critical video packets would be marked with a high priority indicating a need for a high probability for delivery to the decoder. This priority would be associated with I and P Frames generated using H.264 video compression as an example. Less important packets, that if lost could potentially be concealed by the decoder or would have minimum impact on video display quality, would be marked with a lower priority indicating the need for a lower probability for delivery to the decoder. This lower priority would be associated with Bs and B frames generated using H.264 video compression as an example.

During periods of congestion, i.e., when the traffic management system determines that a critical priority packet will not be transmitted in time, discard control function 54 would first select low priority packets to be dropped to achieve sufficient bandwidth requirement reduction to ensure that higher priority packets would have bandwidth to be transmitted toward the subscriber. Low priority packets associated with all video streams being multiplexed for a single access subscriber line would be candidates for the discardable packet selection process in step 90. The idea is that it would be better to discard a low priority frame from another queue within the multiplex group than to discard a higher priority packet from the video stream that was causing the overload condition. The smallest number of low priority packets could be selected similar to step 86 of FIG. 17. If discarding all low priority packets is not enough to provide timely transmission of a high priority packet, then preceding high priority packets in the same queue will be made available for discard in step 92. Thus, a high priority video packet entering the multiplexing queue during congestion periods would have precedence over older packets of the same priority only within the same video stream. The idea is that if multiple high priority video packets are in the multiplex queue at the same time the transmission of the newest high priority will have the best result as far as video display quality is concerned. Also, it is likely that discarding older high priority packets in deference to a new high priority packet will have less objection effects than selecting a high priority packet from another stream, which could suffer objectionable video artifacts. It is more likely that the congested video stream would correct its video quality by the transmission of the new high priority packet.

An example is given in FIG. 19. FIG. 19 represents a traffic management system with queuing and scheduling functions that accommodates multiple video packet streams that are composed of both high priority video data packets and low priority video data packets. Also shown is the existence of a new high priority packet (packet 1*f*) that has arrived at the traffic manager. Packet 1*f* needs to enter Channel Queue 1 and be served by the output stage 44 before it ages pasts a delay period that would cause the packet to arrive at the subscribers video decoder too late to be decoded and displayed. Since this new packet is High Priority, it has to be allowed to enter queue 1. If the total time required to transmit packet 1*f* and all preceding packets is greater than the time-to-live for packet 1*f*, then one or more packets in the queues should be dropped to make room for packet 1*f*. The selection process would select which packet or packets to discard, following the above stated rules for this example, in the following order: 2*a*, n*a*, 1*b*, n*b*, 1*c*, 2*c*, 2*d*, n*d*, 1*e*, 1*a*, 1*d*. The packet dropping process would stop when sufficient bandwidth is gained to be able to transmit the new video packet within the specified maximum age for video packets within the traffic manager.

This method for discarding packets delivers a high level of video display quality to the video viewer, with minimum processing.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A multiplexer, comprising:
a memory queue; and
traffic management circuitry that
    detects one or more sequence patterns of video packets based on inter-packet spacing between the video packets to compute transmission times for data in at least one of the video packets and for video packets ahead in the one or more sequence patterns shared by the at least one of the video packets,
    determines the inter-packet spacing between the video packets by measuring an arrival of the at least one of the video packets to compute a packet spacing value and relating the packet spacing value to a sequenced length of the at least one of the video packets,
    computes transmission times to determine whether the at least one of the video packets stored in the memory queue is stale, and
    discards the at least one of the packets if the computed transmission times indicate data in the at least one of the packets is stale from not being transmitted from the memory queue by an estimated period of time.

2. The multiplexer of claim 1 wherein said traffic management circuitry detects congestion where a current transit time through the multiplexer is greater than a time-to-live parameter associated with an incoming packet.

3. The multiplexer of claim 2 wherein said time-to-live parameter is determined by observing the arrival of incoming packets.

4. The multiplexer of claim 1 wherein the traffic management circuitry detects congestion based on information associated with information on packets to be sent in the future.

5. The multiplexer of claim 4 wherein information on packets to be sent in the future comprises header information from packets to be sent in the future.

6. The multiplexer of claim 5 wherein said header information is stored in a virtual queue.

7. The multiplexer of claim 1 wherein said traffic management circuitry discards packets having interdependencies with previously discarded packets.

8. The multiplexer of claim 7 wherein the packets having interdependencies comprises packets containing differential video data.

9. The multiplexer of claim 1 wherein said memory queue comprises a plurality of first-in, first-out (FIFO) memories associated with respective data streams, and wherein said traffic management circuitry includes circuitry for discarding low priority packets from any of the FIFO memories responsive to a detection of congestion.

10. The multiplexer of claim 9 wherein said traffic management circuitry includes circuitry for discarding high priority packets only from the FIFO memory associated with an incoming packet causing the congestion.

11. A method, comprising:
storing packets of video information in a memory queue; and
detecting, by traffic management circuitry, one or more video packet sequence patterns based on inter-packet spacing between the video packets to compute transmission times for data in at least one of the video packets and for video packets ahead in the one or more sequence patterns shared by the at least one of the video packets;
determining the inter-packet spacing between the video packets by measuring an arrival of the at least one of the video packets to compute a packet spacing value and relating the packet spacing value to a sequenced length of the at least one of the packets;
computing transmission times to determine whether the at least one of the video packets stored in the memory queue is stale; and
discarding the at least one of the packets if the computed transmission times indicate data in the at least one of the packets is stale from not being transmitted from the memory queue by an estimated period of time.

12. The method of claim 11 wherein said detecting step comprises the step of detecting situations where a current transit time is greater than a time-to-live parameter associated with an incoming packet.

13. The method of claim 12 wherein said step of step of detecting situations where a current transit time is greater than a time-to-live parameter associated with an incoming packet comprises the step of observing the arrival of incoming packets to estimate the time-to-live parameter.

14. The method of claim 11 wherein the detecting step comprises the step of detecting congestion based on information associated with information on packets to be sent in the future.

15. The method of claim 14 wherein said step of detecting congestion based on information associated with information on packets to be sent in the future comprises the step of receiving packets including header information from packets to be sent in the future.

16. The method of claim 15 and further comprising the steps of storing the header information in a virtual queue.

17. The method of claim 11 wherein said discarding step comprises the step of discarding packets having interdependencies with previously discarded packets.

18. The method of claim 17 wherein the packets having interdependencies are packets containing differential video data.

19. The method of claim 11 wherein said memory queue comprises a plurality of first-in, first-out (FIFO) memories associated with respective data streams, and wherein said discarding step comprises the step of discarding low priority packets from any of the FIFO memories responsive to a detection of congestion.

20. The method of claim 19 wherein said traffic management circuitry further includes circuitry for discarding high priority packets only from a FIFO memory associated with an incoming packet causing the congestion.

* * * * *